Nov. 24, 1931.  L. C. WEST  1,833,344
JACK FOR RECIPROCATING PUMPS
Filed Feb. 3, 1930  2 Sheets-Sheet 1
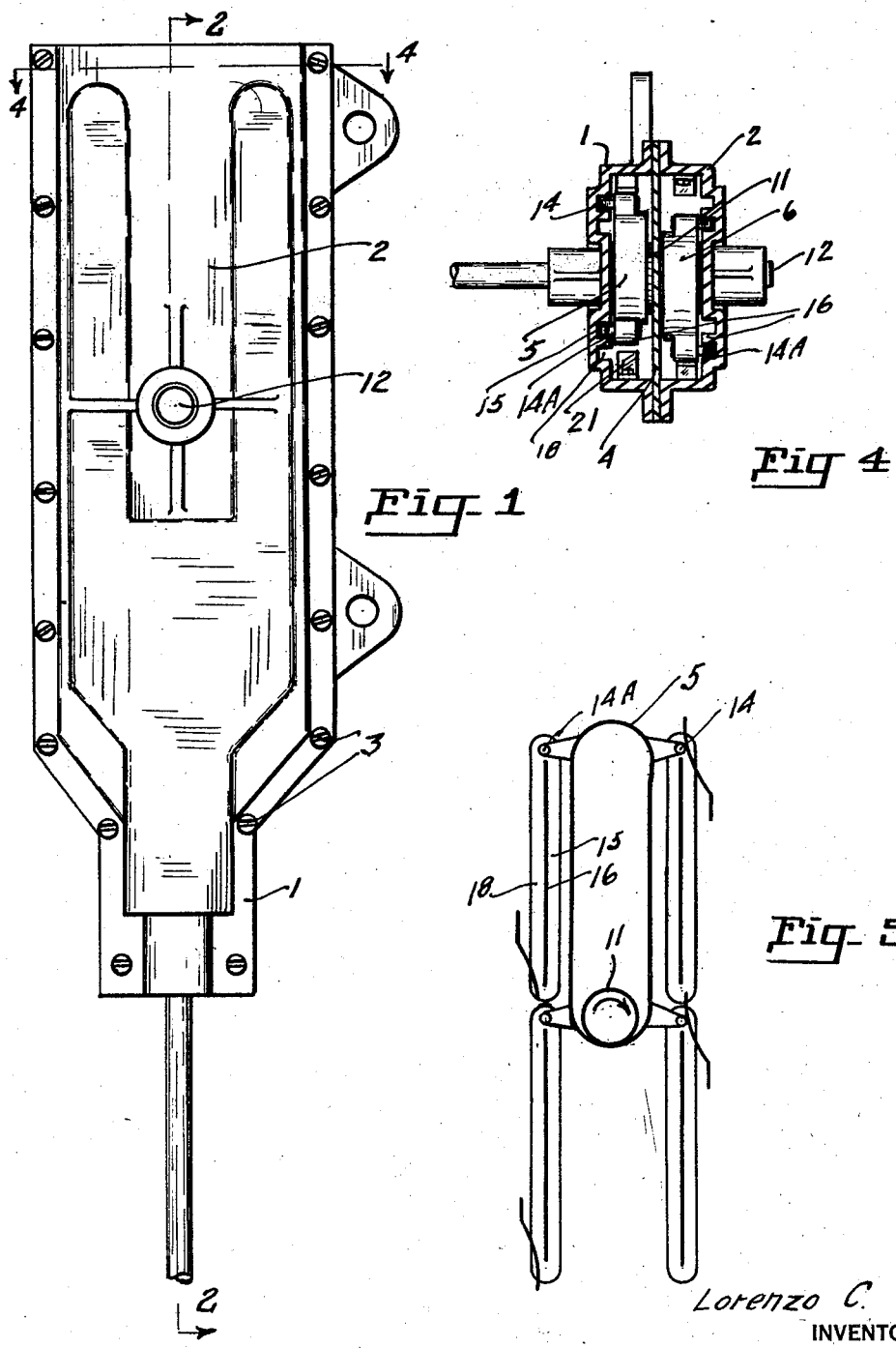
Lorenzo C. West
INVENTOR

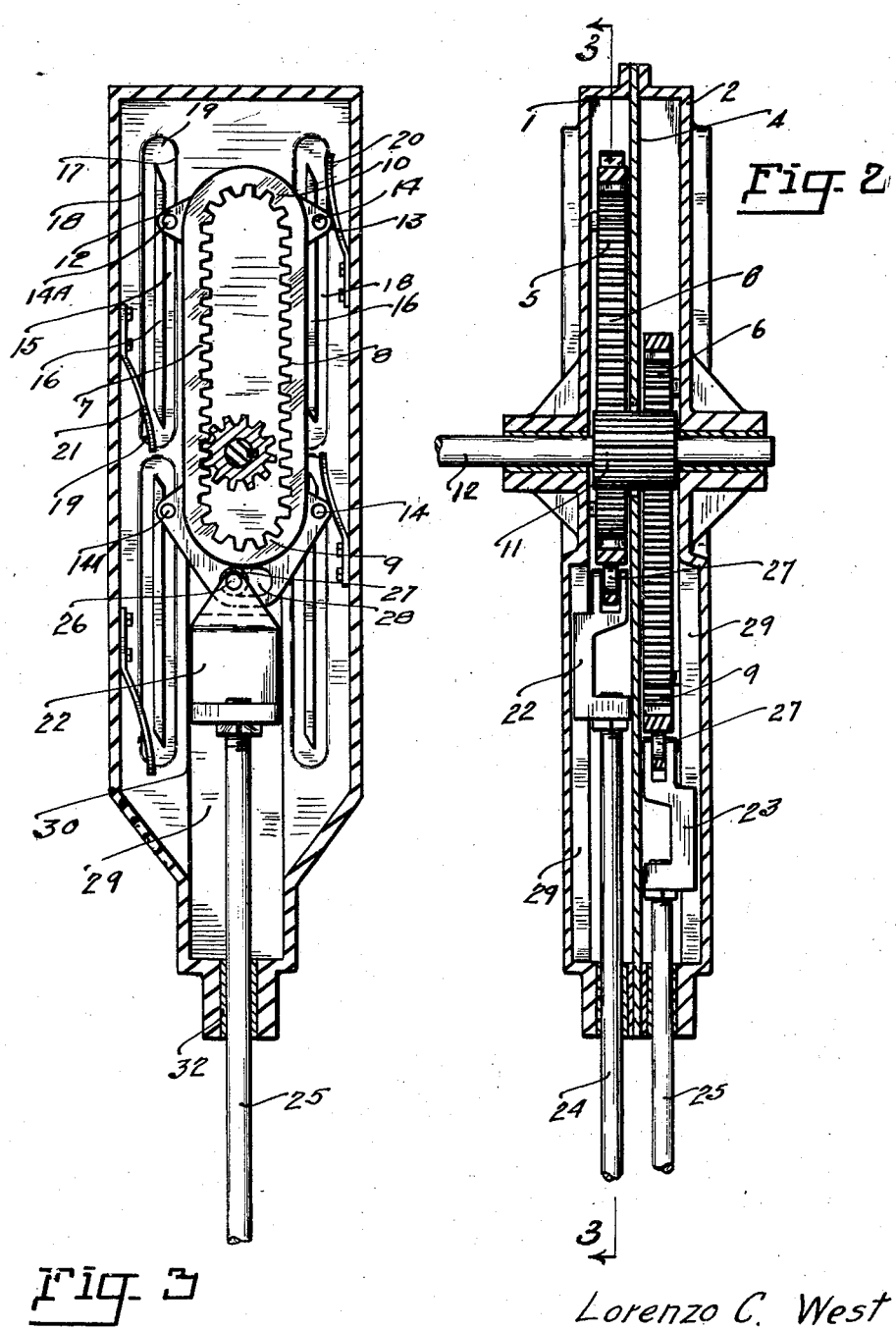

Patented Nov. 24, 1931

1,833,344

UNITED STATES PATENT OFFICE

LORENZO C. WEST, OF GARDEN HOME, OREGON

JACK FOR RECIPROCATING PUMPS

Application filed February 3, 1930. Serial No 425,549.

My invention is intended for use primarily in pumping equipment, but the same may be used with equal facility in any mechanical operations where simultaneously reciprocating movements are desired, that are to be actuated in opposite directions by a common actuator.

The invention consists primarily of an internal gear and a pinion adapted for coacting with the internal gear, oscillating action being provided for maintaining the pinion and the internal gear in coacting relationship for transforming a rotary movement into a reciprocating movement.

The primary purpose of my invention is for the operating of pumping units of the reciprocating piston type.

A further object of my invention consists in providing a driven shaft and having a pinion mounted upon the driven shaft and having one or more internal gears adapted to be actuated through the coacting of the pinion with each of the internal gears to impart a reciprocating motion to the piston rods secured to the internal gear elements. A housing and guideways are provided for the gear elements and journals are provided in the housing for the rotation of the driven shaft therein. The housing is slit to provide for the maintenance, placement and adjustment of the internal driven gears that are disposed within the housing. Means are also provided, at the end of each stroke of the internal gear, to move the same laterally as the pinion is transferred from one side of the internal gear to the other.

The main object of my invention is to transform rotary movement to reciprocating movement through coacting gears.

A further object of my invention consists in having a common driving pinion, for one or more internal driven gears, in order that the gears may be manipulated in opposite directions simultaneously.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a side view of the assembled device, illustrating the housing, and the assembly of the same and the driven shaft journaled therein.

Fig. 2 is a longitudinal, sectional view taken on line 2—2 of Fig. 1 looking in the direction indicated.

Fig. 3 is a longitudinal, sectional, side view taken on line 3—3 of Fig. 2 looking in the direction indicated.

Fig. 4 is a cross section view, taken on line 4—4 of Fig. 1 looking in the direction indicated.

Fig. 5 is a diagrammatical layout of one of the internal gears and of the pinion driving the same, and illustrating the movement imparted to the internal driven gear in diagrammatical layout.

Like reference characters refer to like parts throughout the several views.

I preferably form my device of any suitable housing, preferably made in two parts 1 and 2 and secure the same together by any suitable fastening means as by threaded elements 3. I preferably place a diaphragm 4 between the side elements 1 and 2 in order to separate and maintain the internal gears apart that are disposed within the housing. A pair of internal driven gears 5 and 6 are disposed within the housing and each of the internal driven gears have parallelly disposed side sections 7 and 8, each of the side sections being tangential to the end sections 9 and 10. The internal driven gears coact with, and are adapted to being driven by, a common actuating and driven pinion 11. The pinion 11 is disposed upon a driven shaft 12. Each of the internal gears carry side arms 12A and 13 and a supporting member 13A and guide pins 14 and 14A are carried by each of the arms and by the supporting member 13A. The guide pins are slidably maintained within a predetermined path, by guideway 15. There are four guideways for each internal driven gear and each one is separated into two trackways by a central bar 16 and the outside side walls 17 and 18 of the guideways are each tangential to a semi-circular end 19 disposed at the oppositely disposed end of the guideways. When the internal driven gear 5, as illustrated in Fig. 3, reaches the top of its travel, the actuator springs 20 engage the guide pins 14 and forces them into the oppositely disposed side of the guideway which is the oppositely disposed trackway. When the gear 5 reaches the bottom of its stroke, the guide pins 14A engage the actuator springs 21 and the guide pins are forced into the oppositely disposed trackway. The same movements are assimilated by the gear 6 but in a directly opposite sequence. Slots 28 are disposed through the supporting member 13A and links 22 and 23 are pivotally disposed through to the lower end of the internal driven gears by pins 26 having rollers 27 disposed thereupon, disposed within the slots 28. Each of the links is manipulated within a suitable guideway 29. The side walls of the links engage the side walls 30 and 31 to maintain the links in a straight line movement. Rods 24 and 25 are removably secured to the bottom end of each of the links. Each of the rods pass through a suitable channel bearing 32 disposed within the lower end of the housing.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A device of the class described comprising a housing, a diaphragm disposed within the housing, a driving shaft journaled within the housing, a pinion mounted upon the shaft and disposed within the housing and through the diaphragm, a plurality of internal driven gears longitudinally disposed within the housing and adapted to coact with the pinion, arms oppositely disposed upon the upper side portions of each internal gear, a supporting element having a slot disposed therein disposed upon the lower portion of each internal gear, pins disposed within the arms, pins disposed within the supporting element in registerable alignment with pins disposed within the arms, pairs of guideways disposed upon the housing, each of said guideways having a bar centrally disposed thereon, a link slidably disposed within the slot, and means for shifting the internal gears from one side of a guideway to another.

LORENZO C. WEST.